(12) United States Patent
Bouda

(10) Patent No.: US 8,381,042 B2
(45) Date of Patent: Feb. 19, 2013

(54) METHOD AND APPARATUS FOR LOGGING SYSTEM CHARACTERISTIC DATA

(75) Inventor: Martin Bouda, Plano, TX (US)

(73) Assignee: Fujitsu Limited, Kawasaki-shi (JP)

( * ) Notice: Subject to any disclaimer, the term of this patent is extended or adjusted under 35 U.S.C. 154(b) by 275 days.

(21) Appl. No.: 12/716,697

(22) Filed: Mar. 3, 2010

(65) Prior Publication Data

US 2011/0219270 A1    Sep. 8, 2011

(51) Int. Cl.
*G06F 11/00* (2006.01)
(52) U.S. Cl. .................................... 714/47.1; 714/2
(58) Field of Classification Search ................ 714/4
See application file for complete search history.

(56) References Cited

U.S. PATENT DOCUMENTS

| | | | |
|---|---|---|---|
| 4,597,083 A * | 6/1986 | Stenerson | 714/753 |
| 5,471,485 A * | 11/1995 | Tong | 714/757 |
| 5,602,761 A * | 2/1997 | Spoerre et al. | 702/179 |
| 7,065,566 B2 * | 6/2006 | Menard et al. | 709/223 |
| 7,088,255 B2 * | 8/2006 | Ridolfo et al. | 340/635 |
| 7,587,142 B1 * | 9/2009 | Brodsky et al. | 398/152 |
| 2002/0173997 A1 * | 11/2002 | Menard et al. | 705/7 |
| 2003/0074159 A1 * | 4/2003 | Bechhoefer et al. | 702/181 |
| 2004/0208618 A1 * | 10/2004 | Roberts et al. | 398/158 |
| 2005/0055619 A1 * | 3/2005 | Bedwani | 714/752 |
| 2005/0119996 A1 * | 6/2005 | Ohata et al. | 707/3 |
| 2005/0190359 A1 * | 9/2005 | Bacque et al. | 356/73.1 |
| 2006/0102858 A1 * | 5/2006 | Fujii et al. | 250/559.45 |
| 2006/0265497 A1 * | 11/2006 | Ohata et al. | 709/224 |
| 2008/0066959 A1 * | 3/2008 | Pastusek et al. | 175/39 |
| 2008/0162272 A1 * | 7/2008 | Huang et al. | 705/11 |
| 2008/0320241 A1 * | 12/2008 | Dees et al. | 711/151 |
| 2009/0157699 A1 * | 6/2009 | Ohata et al. | 707/10 |
| 2009/0164623 A1 * | 6/2009 | Dey et al. | 709/224 |
| 2010/0002556 A1 * | 1/2010 | Miyashita et al. | 369/53.31 |
| 2010/0228525 A1 * | 9/2010 | Arneson et al. | 702/182 |
| 2011/0022346 A1 * | 1/2011 | Rossi et al. | 702/130 |
| 2011/0126056 A1 * | 5/2011 | Kelleher et al. | 714/42 |
| 2011/0271161 A1 * | 11/2011 | Kursun et al. | 714/736 |
| 2012/0011173 A1 * | 1/2012 | Ohata et al. | 707/812 |

* cited by examiner

*Primary Examiner* — Kamini Patel
(74) *Attorney, Agent, or Firm* — Baker Botts L.L.P.

(57) ABSTRACT

A method for logging system characteristic data of a system is provided. The method includes receiving a plurality of system characteristic data points associated with a first time period of predetermined length, and generating a one or more first power sums from the plurality of system characteristic data points.

20 Claims, 2 Drawing Sheets

METHOD AND APPARATUS FOR LOGGING SYSTEM CHARACTERISTIC DATA

TECHNICAL FIELD

This disclosure relates in general to monitoring system characteristics and more particularly to a method and apparatus for logging system characteristic data.

BACKGROUND

When troubleshooting a system, it may be desirable to identify a failure event—a breakdown in system performance. In order to localize and identify the cause of such an event, it may be desirable to reconstruct the performance of the system at a given time before, during, and/or after the failure event on a small time scale. The farther in time the reconstruction occurs from the failure event, the more difficult the reconstruction may be. A very large number of samples of system characteristic data on a small time scale is very valuable in case of a failure event. On the other hand, due to storage considerations, it is often impractical or impossible to indefinitely store all detailed system characteristic data.

With limitations on how much data may be stored for a given time period, various statistical operations may be performed on the data in order to compress the information. This compressed information may then be used to give some indication of the system's performance over time. However, these operations cannot accurately capture behavior over time of certain system characteristics, such as the polarization mode dispersion of an optical communication system, that change rapidly and unpredictably. As more and more information is lost due to compression of the stored data, the more difficult it may become to troubleshoot a system or to predict an imminent failure event.

As more and more systems operate at higher data rates and reliance on these systems becomes more widespread, it will become increasingly important to be able to accurately reconstruct the state of a system at a certain recent point in time in order to troubleshoot a past failure event, or to accurately predict a future failure event based on information collected over extended periods of time.

SUMMARY OF THE DISCLOSURE

The present disclosure provides a method and apparatus for logging system characteristic data that substantially eliminates or reduces at least some of the disadvantages and problems associated with previous methods and systems.

According to one embodiment, a method for logging system characteristic data of a system is provided. The method may include receiving a plurality of system characteristic data points associated with a first time period of predetermined length, and generating a one or more first power sums from the plurality of system characteristic data points.

Also provided is a system characteristic logging system for a system, comprising a monitoring unit and a data storage unit. The monitoring unit may be configured to gather a plurality of system characteristic data points associated with a first time period of predetermined length, and the data storage unit may be configured to receive the plurality of system characteristic data points and generate a one or more first power sums from the plurality of system characteristic data points.

Technical advantages of certain embodiments of the present disclosure include providing an effective means of storing performance-related data long term in a manner that minimizes information loss due to compression through combination of two or more data collection periods into a single joint data collection period. More particularly, this approach provides for a progressive data binning method using advanced statistical methods to improve the troubleshooting and predictive capabilities of new and existing communication systems. Other technical advantages will be readily apparent to one skilled in the art from the following figures, descriptions, and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
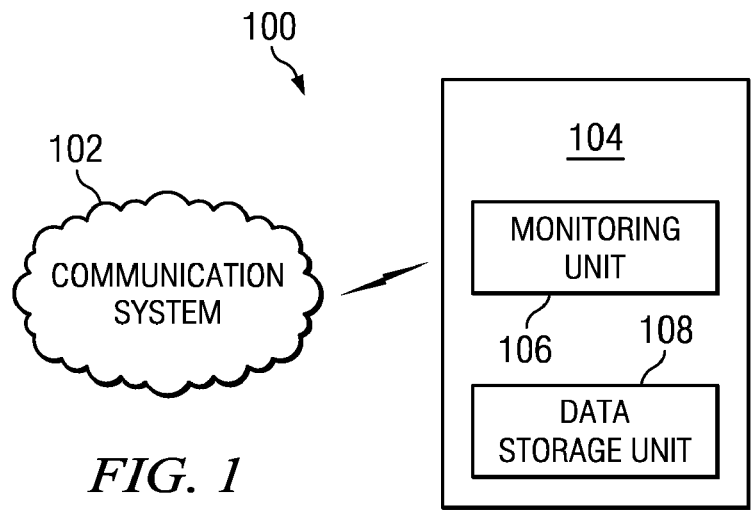
FIG. 1 is a simplified block diagram of a performance logging system, in accordance with certain embodiments of the present disclosure.

FIG. 1 is a simplified block diagram of a performance logging system 100, in accordance with certain embodiments of the present disclosure. According to the illustrated embodiment, performance logging system 100 includes a performing system 102 in communication with a data monitoring system 104. Data monitoring system 104 includes, in some embodiments, monitoring unit 106 and data storage unit 108.

In some embodiments, performing system 102 may be a communications system. A "communications system" may be any object or collection of objects configured to facilitate communication between multiple users over a long distance. Illustrative examples may include an optical communications network, internet, intranet, telephone system, or any other communication system configured to have one or more performance characteristics monitored at one or more points throughout the system. In other embodiments, performing system 102 may be a manufacturing production system or any other system for which it may be necessary or desirable to monitor system characteristic data.

In general, the components of performance logging system 100 may operate to monitor the performance of performing system 102 in a substantially continuous manner, and store the monitored system characteristic data within data monitoring system 104 in such a way as to be compactly stored and accurately reconstructed to troubleshoot a past failure event or predict a future failure event. Data monitoring system 104 may monitor a number of different system characteristics of communication system 102, including optical channel power, signal-to-noise ratio, bit error rate, chromatic dispersion, differential group delay, data delay, or polarization mode dispersion for a communication system; or any other measured or calculated data point useful in monitoring the performance of performing system 102 such as equipment power levels, production error rates, or indicia of production quality for a manufacturing production system.

In some embodiments, data monitoring system 104 may include monitoring unit 106 and data storage unit 108. Monitoring unit 106 may be configured to monitor one or more components of performing system 102 for the system characteristic data. In some embodiments, monitoring unit 106 may directly measure various components of performing network 102 for the selected system characteristic data. For example, for a communications system, monitoring unit 106 may measure the bit error rate at a receiving end of performing system 102 either before or after error correction. In other embodiments, monitoring unit 106 may only gather system characteristic data measured elsewhere. For instance, for an optical communications system, monitoring unit 106 may gather the optical channel power information from the various nodes of the optical communication system and compile them before communicating the data to data storage unit 108 for storage.

Data storage unit 108 may be configured to store the system characteristic data gathered and/or monitored by monitoring unit 106. Data storage unit 108 may be any appropriate computer-readable memory such as a database and/or database management system suitable for use in a large-scale data storage system, such as Oracle Database or IBM's DB2. The manner in which the system characteristic data is stored in data storage unit 108 is described in more detail below with reference to FIG. 2.

The components of data monitoring system 104 may be, in some embodiments, a software program stored on computer-readable media and executable by a processor. For clarity of description, FIG. 1 depicts data monitoring system 104 and performing network 102 as separate components. However, in some embodiments, some or all of the components of data monitoring system 104 may be present within performing network 102. For example, in some embodiments data monitoring system 104 may be a separate system attached to performing network 102 in order to monitor the performance of performing network 102 and store the monitored data. In other embodiments, the data monitoring and gathering functions may be performed by performing network 102 itself, and the data transmitted to an external data storage unit 108 for storage. In still other embodiments, system characteristic data may be monitored, gathered, and stored wholly within performing network 102. For instance, in an optical communication system, an optical channel monitor integrated into the hardware and/or software of a node of the optical communication system may be configured to monitor and gather the desired system characteristic data, such as channel power, power relative to noise, and/or signal-to-noise ratio. The node of the optical communications system may also have an associated storage system configured to store the gathered system characteristic data on a long-term basis. As a result of the various configurations of performance logging system 100, the components of data monitoring system 104 may be a component or subroutine of a larger software program, or hard-coded into computer-readable media, and/or any hardware of software modules configured to perform the desired functions.

Figure 2:
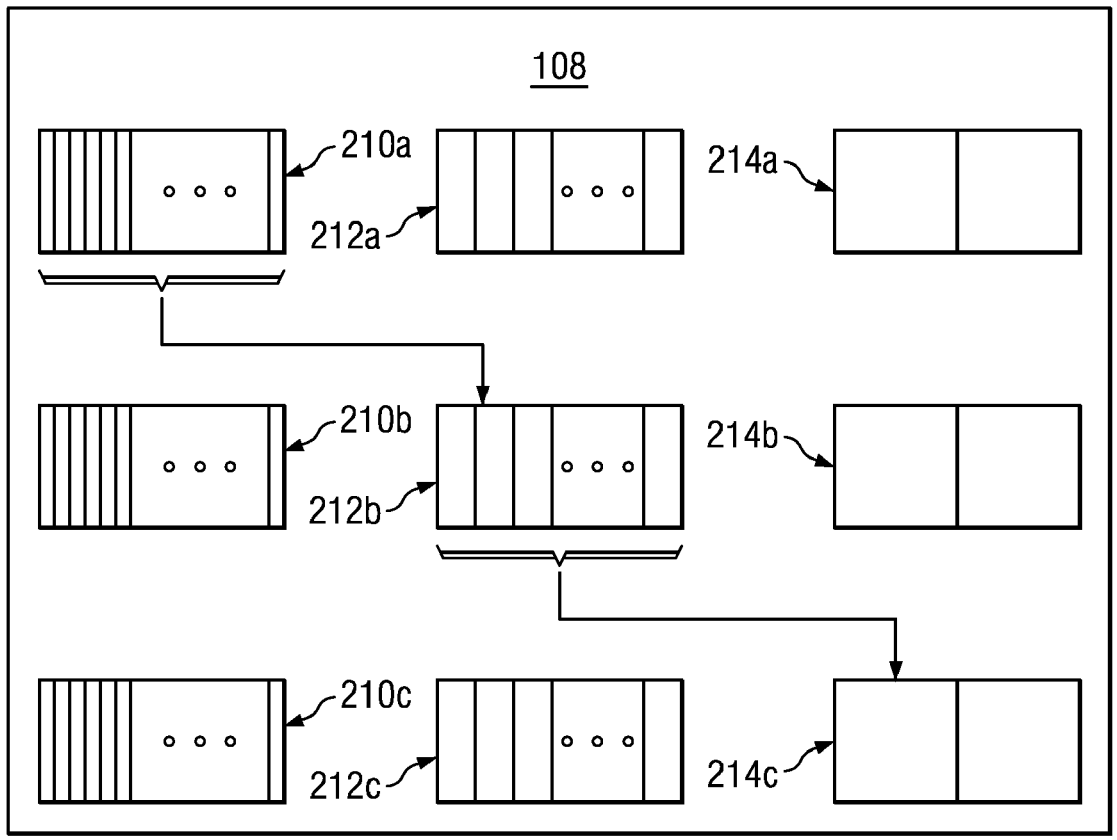
FIG. 2 is a simplified block diagram illustrating various potential data structures that may be used for storing and retaining system characteristic data within data storage unit of data monitoring system, in accordance with certain embodiments of the present disclosure.

FIG. 2 is a simplified block diagram illustrating various potential data structures that may be used for storing and retaining system characteristic data within data storage unit 108 of data monitoring system 104, in accordance with certain embodiments of the present disclosure. The illustrated data storage unit 108 may include a plurality of data structures. As used in this disclosure, the term "data structure" may include any appropriately-sized block of computer-readable memory, whether consecutive or nonconsecutive, configured to store one or more data values.

For ease of illustration, data storage unit 108 is depicted as including three data structures: short-term data structure 210, medium-term data structure 212, and long-term data structure 214. Although only three data structures are shown, data storage unit 108 may have more or fewer data structures. Additionally, short-term, medium-term, and long-term data structures 210, 212, 214 are shown as distinct structures solely for ease of illustration. In some embodiments, the data structures may be present in the same or different databases or data storage units 108. The data structures may also be subsets of a larger data structure. To facilitate understanding, the three data structures 210, 212, 214 are shown at three different points in time, as discussed in more detail below. Short-term data structure 210 is denoted at the first point in time as 210*a*, at the second, later point in time 210*b*, and at the third, latest point in time 210*c*. Medium-term data structure 212 and long-term data structure 214 are denoted likewise.

The data stored in data storage unit 108 may, in some embodiments, be the result of a data processing technique known as data "binning." In data binning, a single value-representative of a range of values over time—is stored. For example, if one desired to monitor the signal-to-noise ratio data for a communication system, it may be desirable to monitor the signal-to-noise ratio for a predetermined time period, e.g., one minute, and store a single value representative of the ever-changing signal-to-noise ratio over the course of that time period, rather than storing all values measured during that time period. The single stored value may be mean value over the time interval, the median value, or any other value deemed appropriately representative of the system characteristic data over the time period. In this example, if the signal-to-noise ratio were measured four times over the course of a minute and the measurements were 38 dB, 35 dB, 42 dB, and 45 dB, then the value stored may be the average value corresponding to the measuring minute, 40 dB. In this manner, continuous system characteristic data may be quantized and more easily stored. In other means of data binning, the data stored may be the result of other statistical and/or measurement techniques configured to represent the system characteristic data over a certain period of time. For instance, the system characteristic data may be sampled once every time period, e.g., once a second, and that sampled value stored. The time period represented by one value, or a single set of values describing a characteristic over that period may be referred to as a "bin."

If the stored values in the bins correspond to time periods of a sufficiently short duration, it may be possible to make an accurate reconstruction of system performance shortly before and after a failure based on those bins to determine the cause of a failure due to fast transients in a particular performance or system characteristic. However, with finite storage space, it may be unfeasible to retain all data of a sufficiently short duration to accurately reconstruct a system for such troubleshooting. At the same time, any system failure becomes evident and known in a short time, at which time the present stored data can be copied to a separate storage for off-line analysis. In absence of a failure, the usefulness of data in short bins is diminished and storage of this level of detail would be inefficient. Current systems deal with finite storage by binning data over long periods of time. This method may, however, lead to an unacceptable loss of information contained in the binned data, preventing fault localization and sufficient of possible cause. For example, if the bin data value is an average of the data values over time, then the longer the time period corresponding to the bin value, the less information about the system's actual performance is represented by the bin value.

In addition to information loss, this method may be unacceptable or undesirable for monitoring performance or system characteristics of some types of communication systems, such as polarization mode dispersion and polarization dependent loss in optical communication systems. These types of effects may be highly transitory in nature, but a short excursion may cause a major failure event in an optical communication system. Therefore, short period data bins are needed shortly before and after a failure event, and accurate statistical probability distribution characteristics over a longer-term are very important to predict future failures or probabilities of such failures.

Referring again to FIG. 2, short-term data structure 210 may, in some embodiments, be a data storage space sufficient to store a plurality of data bins, each data bin corresponding to a first predetermined time period. In some embodiments, this first predetermined time period may be sufficiently short so as to accurately convey information surrounding the performance of performing system 102. For different system characteristic data types, this time period may be different. For example, for a communications system it may be unnecessary to gather data regarding signal-to-noise ratio and polarization mode dispersion at the same level of granularity. In the illustrated embodiment, the time period corresponding to the bins of short-term data structure 210 may be one second. Rather than storing averages or sampled values representative of a time period, information accuracy may be improved by storing one or more power sums of the system characteristic data gathered over the course of the time period. For the purposes of this disclosure, a power sum is defined to be "$S_r$" in FORMULA 1, below.

$$S_r = \sum_{i=1}^{n} X_i^r \qquad \text{FORMULA 1}$$

In FORMULA 1, "r" represents the order of the power sum, and "n" represents the number of measured values $X_i$ gathered. As a simplified example, if the first predetermined time period were selected to be one second, and the system characteristic data of interest was signal-to-noise ratio, then the set of measurements taken over the course of one second might be the set {40, 42, 41, 40, 38, 37, 39, 40, 40, 43}. The first order power sum ($S_1$) for this set would be 400. The second order power sum ($S_2$) for this set would be 16,028. In some embodiments, multiple power sums may be stored within a given data bin. As discussed in more detail below with reference to FORMULAS 2-4, the more power sums stored, the greater the potential accuracy of a recreation of the statistical probability distribution of measurements X on which it is based.

Calculating power sums, rather than using averages or sampling data, has the advantage of being commutative. Thus, the information represented by multiple bins may be combined into a single bin with much less statistical information loss. This combination may be done by adding together the power sums corresponding to the combined bins, as well as combining the number of samples of each bin being combined, and storing the combined power sums and number of samples in the combined bin. Continuing the illustrative example above, if a first bin of short-term data structure 210 held the first order power sum 400 for a first second, and a second bin of short-term data structure 210 held the first order power sum 404 for a second, these two bins could be combined to have a first order power sum of 804 for the combined two-second time period. As discussed below, this granularity leads to less statistical information loss.

The power sums may be used in reconstructing the statistics of monitored performance or system characteristics of performing system 102 over particular periods in time by applying further statistical analysis to the power sums. For instance, the power sums may be used to calculate the "k-statistics" corresponding to a particular order of power sum. As an example, the first three k-statistics are described by the following formulas.

$$k_1 = \frac{S_1}{n}$$

$$k_2 = \frac{nS_2 - S_1^2}{n(n-1)}$$

$$k_3 = \frac{2S_1^3 - 3nS_1S_2 + n^2S_3}{n(n-1)(n-2)}$$

The k-statistics are unbiased estimators of corresponding cumulants, and may be used to estimate a probability density function of a particular data set as well as properties of that data set, such as average, standard deviation, and skewedness. By applying these and other statistical tools to a power sum, a more accurate statistical representation of performing system 102 over a particular period in time may be achieved.

The bins contained in short-term data structure 210 may contain the number of data points gathered ("n" in FORMULAS 1-4) as well as one or more power sum(s) calculated from the gathered system characteristic data. The actual number of power sums stored may depend on the particular configuration chosen, including factors such as the system characteristic data under consideration and the amount of storage available. In the illustrated embodiment, short-term data structure is shown at three separate points in time, denoted as, in order of earliest to latest, 210a, 210b, and 210c. At the earliest point in time, system characteristic data is being gathered from performing system 102. The power sum(s) corresponding to the gathered data are calculated and stored in a bin of short-term data structure 210a, with each bin representing one duration of the first predetermined time period, e.g., one second. At this point in time, medium-term data structure 212a and long-term data structure 214a may or may not have data currently stored.

After a second predetermined time period, it may be desirable to combine the bins of short-term data structure 210 into other bins corresponding to longer periods of time in order to store less data. In the illustrated configuration, the second predetermined time period is 30 minutes. Short-term data structure 210 may fill 1800 bins, with each representing one second in time. Once these 1800 bins of short-term data structure 210 are full, data monitoring system 104 may combine the 1800 bins of short-term data structure 210 into a single bin value to be stored in medium-term data structure 212.

At the second point in time, the n values and power sums of the bins of short-term data structure 210b are added together to create a single n value and a single set of power sums representative of the second predetermined time period, e.g., 30 minutes. This n and these power sums are then stored in a bin of medium-term data structure 212b. At this point, 30 minutes of system characteristic data may be represented by a single set of information (n and the power sums) rather than 1800 sets, with minimal loss of statistical information. At this point in time, long-term data structure 214b may or may not have data currently stored, and short-term data structure 210b may begin replacing its data bin values either wholesale or in a rolling fashion.

The n values and power sums of short-term data structure 210 may be repeatedly added together to create multiple bins stored in medium-term data structure 212. Depending on the configuration, it may be desirable to further compress the information stored in medium-term data structure 212 after a third predetermined time period has elapsed. In the example embodiment, the third predetermined time period is eight hours. Once medium-term data structure 212 accumulates sufficient data to represent eight hours (e.g., 16 bins), the n values and power sum(s) of those bins may be combined to create a single n value and a single set of power sum(s) representative of the entire third predetermined time period.

At the third point in time, medium-term data structure 212c combines the n values and power sum(s) of its constituent bins and communicates the new total to long-term data structure 214c. Long-term data structure 214c may, in some embodiments, be configured to retain a large number of longer term bins. For example, if long-term data structure 214 is configured to store 1800 bins, as is short-term data structure 210 in the illustrated embodiment, long-term data structure 214 may store data representative of 14,400 hours (600 days) of system characteristic data. In addition, well-known lossless data compression and storage methods could be applied to further reduce the volume of stored data.

Figure 3:
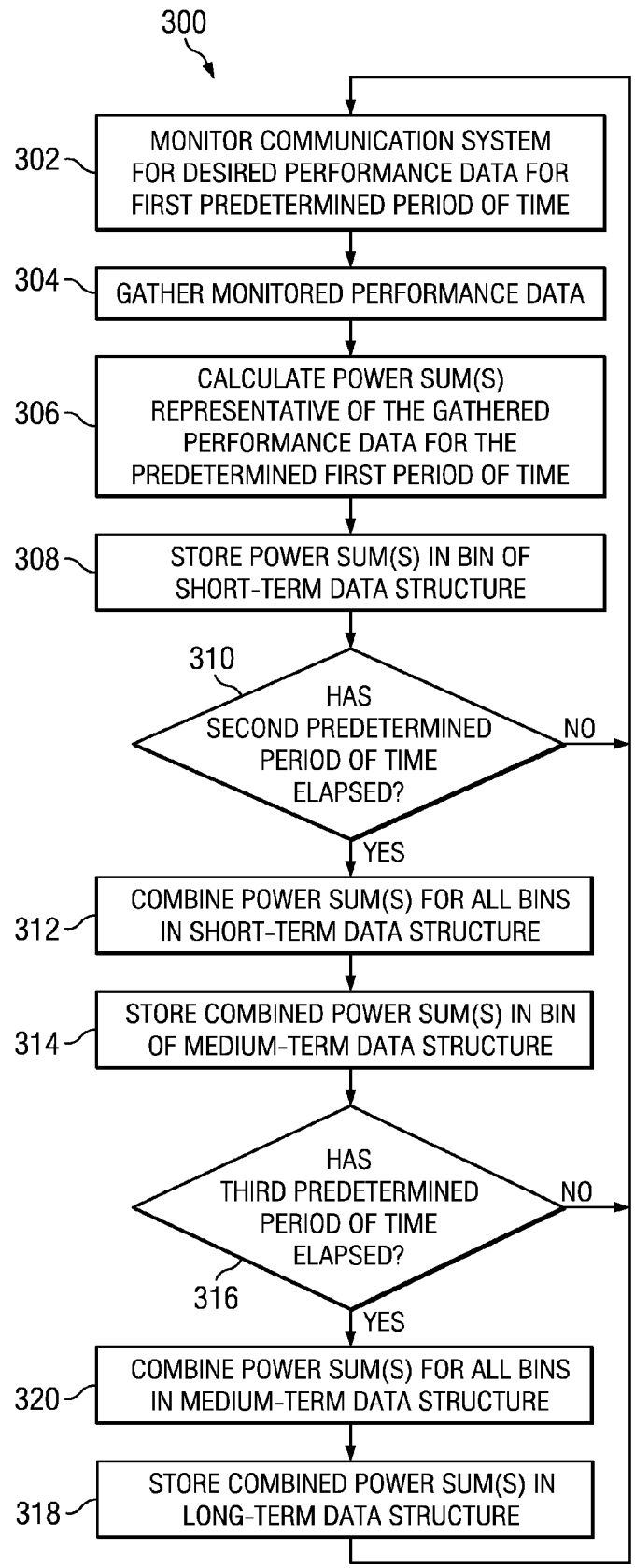
FIG. 3 illustrates a flow chart of an example method for logging system characteristic data of a communications system, in accordance with certain embodiments of the present disclosure.

FIG. 3 illustrates a flow chart of an example method 300 for logging system characteristic data of a communications system, in accordance with certain embodiments of the present disclosure. Method 300 includes monitoring one or more types of system characteristic data, gathering the system characteristic data, calculating power sums representative of the gathered data, storing the power sums in a bin, and, after a predetermined period of time, combining the power sums of the bins into a single set of power sums representative of the predetermined period of time.

According to one embodiment, method 300 preferably begins at step 302. Teachings of the present disclosure may be implemented in a variety of configurations of performance logging system 100. As such, the preferred initialization point for method 300 and the order of steps 302-320 comprising method 300 may depend on the implementation chosen. Additionally, the steps of method 300 may be performed in any appropriate order other than the order illustrated.

At step 302, monitoring unit 106 of data monitoring system 104 monitors one or more performance characteristics of performing system 102. As described in more detail above with reference to FIG. 1, monitoring unit 106 may be implemented in a variety of configurations depending on the performance characteristic monitored. For instance, monitoring unit 106 may be an integral part of an optical communication system designed to directly measure channel power at a node of the optical communication system. In some embodiments, the system characteristic data may be measured and/or calculated. These measurements and/or calculations may be taken for a first predetermined period of time. In some embodiments, power sums may be normalized to avoid the need of storing values of excessive magnitude. As described in more detail above with reference to FIG. 2, this first predetermined period of time may be chosen so as to describe the performance of performing system 102 with sufficient accuracy. This period of time may vary depending on the system characteristic data chosen. As an illustrative example, the first predetermined period of time may be one second. After monitoring the performance or system characteristic data for the first predetermined period of time, method 300 may proceed to step 304. At step 304, the monitored data is gathered by monitoring unit 106. As described in more detail above with reference to FIG. 1, the monitoring and gathering functions of monitoring unit 106 may be performed by the same or different units. After gathering the system characteristic data, method 300 may proceed to step 306.

At step 306, one or more power sum(s) are calculated from the gathered data. This calculation may be performed by monitoring unit 106 of data monitoring system 104 or any other component or components configured to calculate power sums. The number of power sums calculated may vary from configuration to configuration, as described above in more detail with reference to FIG. 2. After calculating the power sum(s), method 300 may proceed to step 308.

At step 308, the power sum(s) may be stored in a bin of short-term data structure 210, as described in more detail above with reference to FIG. 2. After storing the power sum(s), method 300 may proceed to step 310, where method 300 may determine whether a second predetermined period of time has passed. This second predetermined period of time may correspond to the size of short-term data structure 210, to some subset of short-term data structure 210, or to a period of time after which the particular configuration of performance logging system 100 requires compression of the data stored in short-term data structure 210. As described in more detail above with reference to FIG. 2, after passage of the second predetermined period of time, the data in short-term data structure 210 may be compressed into one bin of medium-term data structure 212. Returning now to step 308 of method 300, if the second predetermined period of time has not elapsed, then method 300 may return to step 302. The bins of short-term data structure 210 may continue to fill. If the second predetermined period of time has elapsed, then method 300 may proceed to step 312.

At step 312, the power sum(s) of all the bins of short-term data structure 210 are combined to form a single set of power sum(s) to be stored in one bin of medium-term data structure 212. After combining the power sum(s), method 300 may proceed to step 314, where the new power sum(s) are stored. After storage, method 300 may proceed to step 316.

At step 316, method 300 may determine whether or not a third predetermined period of time has elapsed. The third predetermined period of time may correspond to the size of medium-term data structure 212, to some subset of medium-term data structure 212, or to a period of time after which the particular configuration of performance logging system 100 requires compression of the data stored in medium-term data structure 212. As described in more detail above with reference to FIG. 2, after passage of the third predetermined period of time, the data in medium-term data structure 212 may be compressed into one bin of long-term data structure 214. Returning now to step 316 of method 300, if the third predetermined period of time has not elapsed, then method 300 may return to step 302. The bins of short-term data structure 210 and medium-term data structure 212 may continue to fill. If the third predetermined period of time has elapsed, then method 300 may proceed to step 318.

At step 318, the power sum(s) of all the bins of medium-term data structure 212 are combined to form a single set of power sum(s) to be stored in one bin of long-term data structure 214. After combining the power sum(s), method 300 may proceed to step 320, where the new power sum(s) are stored. After storage, method 300 may proceed to step 302, where method 300 may continue to monitor system characteristic data.

Although FIG. 3 discloses a particular number of steps to be taken with respect to method 300, method 300 may be executed with more or fewer steps than those depicted in FIG. 3. For instance, in some embodiments, method 300 may include the further steps of compressing the data stored in long-term data structure 214 into still longer term storage in order to facilitate a particular data storage configuration. In other embodiments, method 300 may include a further step or steps involving the communication of the power sum(s) from one data structure to another, as described in more detail above with reference to FIG. 2. In yet other embodiments, individual measurement points can be stored in a raw format over a predetermined time period before combining one or more of such measurement(s) in bins and calculating the associated power sums. In further embodiments, the number of system characteristic data points used to calculate the first set of power sum(s) may be combined and stored along with the second set of power sum(s).

In addition, although FIG. 3 discloses a certain order of steps comprising method 300, the steps comprising method 300 may be completed in any suitable order. For example, in the embodiment of method 300 shown, short-term data structure 210 is filled, then medium-term data structure 212 is filled, and then long-term data structure 214 is filled. In some configurations, it may be desirable to update the stored power sum(s) on a rolling basis rather than replace them.

Using the methods and systems disclosed herein, certain problems associated with logging system characteristic data of a communication system may be improved, reduced, or eliminated. For example, the methods and system disclosed herein allow for a progressive binning system in which detailed system characteristic data is combined and stored according to calculated power sums, which may allow for a minimal loss of statistical information resulting from the data compression.

What is claimed is:

1. A method for logging system characteristic data of a system, comprising:
   receiving a plurality of system characteristic data points associated with a first time period of a first predetermined length;
   generating one or more first power sums from the plurality of system characteristic data points;
   receiving a plurality of additional system characteristic data points associated with one or more additional first time periods of the first predetermined length;
   generating one or more additional first power sums from the plurality of additional system characteristic data points; and
   combining a plurality of the one or more first power sums of the first time periods to generate one or more second power sums associated with a second time period of a second predetermined length that is longer than the first predetermined length.

2. The method of claim 1, wherein the second time period is the union of the first time periods associated with the plurality of the one or more first power sums.

3. The method of claim 1, further comprising:
   storing a combined sample size with the one or more second power sums, wherein the combined sample size is the combination of the number of system characteristic data points used to calculate the plurality of the one or more first power sums.

4. The method of claim 1, wherein the plurality of system characteristic data points comprises data concerning differential group delay.

5. The method of claim 1, wherein the plurality of system characteristic data points comprises data concerning bit error count before error correction.

6. The method of claim 1, wherein the plurality of system characteristic data points comprises data concerning power relative to noise.

7. The method of claim 1, further comprising:
   using the one or more first power sums to estimate the moments of a statistical distribution associated with the plurality of system characteristic data points.

8. The method of claim 1, wherein the predetermined length of the first time period is approximately 100 milliseconds.

9. The method of claim 1, wherein the predetermined length of the second time period is approximately 30 minutes.

10. The method of claim 1, further comprising:
    using the one or more first power sums to estimate probability of system failure.

11. A system characteristic logging system for a system, comprising:
    a monitoring unit configured to gather a plurality of system characteristic data points associated with a first time period of a first predetermined length; and
    a data storage unit configured to:
       receive the plurality of system characteristic data points;
       generate one or more first power sums from the plurality of system characteristic data points;
       receive a plurality of additional system characteristic data points associated with one or more additional first time periods of the first predetermined length;
       generate one or more additional first power sums from the plurality of additional system characteristic data points; and
       combine a plurality of the one or more first power sums of the first time periods to generate one or more second power sums associated with a second time period of a second predetermined length that is longer than the first predetermined length.

12. The system of claim 11, wherein the second time period is the union of the first time periods associated with the plurality of the one or more first power sums.

13. The method of claim 11, wherein the data storage unit is further configured to:
    store a combined sample size with the one or more second power sums, wherein the combined sample size is the combination of the number of system characteristic data points used to calculate the plurality of the one or more first power sums.

14. The system of claim 11, wherein the plurality of system characteristic data points comprises data concerning differential group delay.

15. The system of claim 11, wherein the plurality of system characteristic data points comprises data concerning bit error count before error correction.

16. The system of claim 12, wherein the plurality of system characteristic data points comprises data concerning power relative to noise.

17. The system of claim 12, wherein the data storage unit is further configured to:
    use the one or more first power sums to estimate the moments of a statistical distribution associated with the plurality of system characteristic data points.

18. The system of claim 11, wherein the predetermined length of the first time period is approximately 100 milliseconds.

19. The system of claim 11, wherein the predetermined length of the second time period is approximately 30 minutes.

20. The system of claim 11, wherein the data storage unit is further operable to:
    use the one or more first power sums to estimate probability of system failure.

* * * * *

UNITED STATES PATENT AND TRADEMARK OFFICE
CERTIFICATE OF CORRECTION

PATENT NO. : 8,381,042 B2
APPLICATION NO. : 12/716697
DATED : February 19, 2013
INVENTOR(S) : Martin Bouda Page 1 of 1

It is certified that error appears in the above-identified patent and that said Letters Patent is hereby corrected as shown below:

In the Claims

Column 10, Line 46: After "The system of claim" and before "wherein the plurality" delete "12," and insert --11,--.

Column 10, Line 49: After "The system of claim" and before "wherein the plurality" delete "12," and insert --11,--.

Signed and Sealed this
Fourth Day of November, 2014

Michelle K. Lee
*Deputy Director of the United States Patent and Trademark Office*